United States Patent [19]

Bauer

[11] 4,104,575

[45] Aug. 1, 1978

[54] CONSTANT CURRENT SEMICONDUCTOR CIRCUIT ARRANGEMENT

[75] Inventor: Hubert Bauer, Holzkirchen, Fed. Rep. of Germany

[73] Assignee: Messerschmitt-Boelkow-Blohm GmbH, Munich, Fed. Rep. of Germany

[21] Appl. No.: 782,231

[22] Filed: Mar. 28, 1977

[30] Foreign Application Priority Data

Apr. 10, 1976 [DE] Fed. Rep. of Germany ....... 2615848

[51] Int. Cl.[2] ............................ G05F 3/08; H02J 1/04

[52] U.S. Cl. ......................................... 323/4; 307/297; 307/304; 323/22 R

[58] Field of Search .................. 323/1, 4, 9, 16, 22 R; 307/297, 304, 296

[56] References Cited

U.S. PATENT DOCUMENTS

| | | | |
|---|---|---|---|
| 3,832,644 | 8/1974 | Nagata et al. | 323/22 R |
| 4,020,367 | 4/1977 | Yamashiro et al. | 307/304 |
| 4,031,456 | 6/1977 | Shimada et al. | 323/4 |

OTHER PUBLICATIONS

*IBM Tech. Disc. Bulletin,* vol. 13, No. 9, Feb. 1971; p. 2516, "Constant-Current Source Network" by Baitinger et al.

*Electronic Design* 12, Jun. 7, 1976, pp. 160-161, "Fets Provide Current Limiting . . . . " by Graveff et al.

*Primary Examiner*—Gerald Goldberg

*Attorney, Agent, or Firm*—W. G. Fasse; W. W. Roberts

[57] ABSTRACT

A constant current source is provided by a circuit of two metal oxide semiconductor field effect transistors (MOSFET) of the enhancement type having opposite conductivities. One transistor constitutes an input transistor. The other transistor is the output transistor. The drain terminals are connected to the respective polarities of an operating voltage source. The gate terminal of the input transistor is connected to a control voltage source. The source terminals are interconnected and grounded through a resistor. The constant current is available at the drain electrode of the output transistor. If it is desired to produce constant output currents of alternating directions, two such circuits may be interconnected in mirror symmetrical fashion.

7 Claims, 2 Drawing Figures

CONSTANT CURRENT SEMICONDUCTOR CIRCUIT ARRANGEMENT

BACKGROUND OF THE INVENTION

The present invention relates to a constant current semiconductor circuit arrangement. More specifically, the invention relates to producing constant currents in the order of $10^{-12}$ to $10^{-3}$ ampere, whereby the accuracy shall be within the range of ±0.5%. Currents of this type are required in the field of nuclear physics and for the calibrating of rapid, automatic electrometer amplifiers. Known circuits of this type are, for instance, described in the book "Semiconductor Circuit Techniques" (Halbleiter-Schaltungstechnik) by U. Tietze and Ch. Schenck, publisher Springer-Verlag 1974, Pages 132 to 137. Such circuits comprise a field effect transistor as the operational transistor of the circuit. However, such circuits are not suitable for the intended purposes, especially where the production of currents in the Pico-Ampere range is involved. This is due to the transistor characteristics of the transistors employed heretofore in such comparable circuits.

Other known circuit arrangements for producing currents in the Pico-Ampere range require a costly network of high resistance resistors and field effect transistor switches. In addition, these prior art circuits have the disadvantage of relatively long transient or response times when the current values are changed. Constant current sources of this type are, for example, on the market under the name "Picoampere-Source", manufactured by Keithley Instruments, California.

OBJECTS OF THE INVENTION

In view of the above, it is the aim of the invention to achieve the following objects, singly or in combination:

- to provide a circuit arrangement for a constant current source which is capable to provide constant currents of a relatively low, yet wide ampere range, whereby the currents must be available within a relatively short transient or built up time after a change in the supplied control voltage;
- to provide a constant current circuit arrangement which may be duplicated and interconnected in mirror symmetrical fashion so as to produce constant output currents of differing directions; and
- to employ MOSFETs having a high transconductance for advantageously influencing the constancy of the produced current.

SUMMARY OF THE INVENTION

According to the invention there is provided a circuit arrangement for a constant current source, wherein two MOSFETs of the enhancement type with mutually opposite conductivities (P-type, N-type) are interconnected so that the source terminals are connected to each other and through a resistor to ground. The gate terminal of the output transistor and the two substrate terminals of both transistors are also grounded and thus interconnected through said resistor with the source terminals. The gate terminal of the input transistor is connected to a control voltage source having a polarity corresponding to the conductivity type of the input transistor. The drain terminals of both transistors are connected to an operating voltage source in such a manner that the polarity of the terminals of the voltage source correspond to the conductivity of the respective transistor, whereby the drain current of the output transistor remains constant even at high switching speeds of the control voltage source at the gate terminal of the input transistor, said drain current being proportional to said control voltage.

Constant output currents of differing flow directions may be produced according to the invention at a common ouput terminal by mirror symmetrically interconnecting two circuit arrangements, as described above. Thus, according to the invention there is further provided a circuit arrangement with two pairs of transistors and the conductivity types of the second pair are opposite to those of the first pair. Circuit means are provided for connecting the gate terminals of the two input transistors to a common control voltage terminal. The control voltage source provides a control voltage of alternating polarity. The two drain terminals of the two output transistors are connected to a common current output terminal which supplies a constant current output corresponding in size and direction to the input voltage. The two drain terminals of the input transistors are connected to a operating voltage source having respective positive or negative terminals symmetrical relative to ground.

By using of MOSFET types of high transconductance, it is possible to advantageously influence the constancy of the currents produced by these circuit arrangements, according to the invention. In order to achieve short transient or built up times, it is desirable to arrange between the source and the gate terminal of the output transistor, a resistor which is equal to or smaller than one megohm.

BRIEF FIGURE DESCRIPTION

In order that the invention may be clearly understood, it will now be described, by way of example, with reference to the accompanying drawings, wherein:

FIG. 1 is a circuit arrangement according to the invention for producing constant currents of unipolar direction; and FIG. 2 is an embodiment similar to that of FIG. 1, however, adapted for producing constant currents of alternately opposite directions.

DETAILED DESCRIPTION OF PREFERRED EXAMPLE EMBODIMENTS

Figure 1:
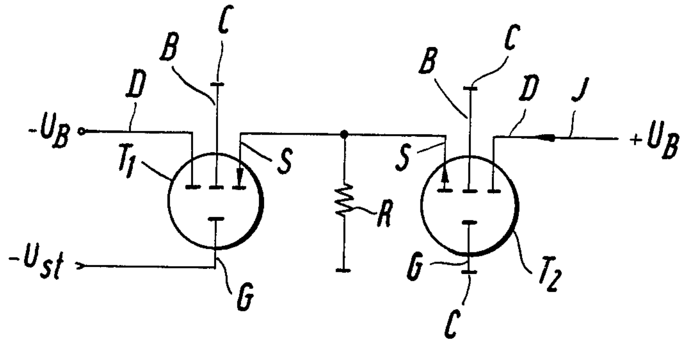

FIG. 1 illustrates a circuit arrangement comprising two transistors $T_1$, $T_2$ of the MOSFET enhancement type which are self locking. Transistors of this type have the capability to be brought into the self conducting state by applying a gate voltage of zero volts and supplying a control voltage to the substrate terminal B.

For example, the input transistor $T_1$ may be of the P-conductivity type and the output transistor $T_2$ may be of the N-conductivity type. In this example the drain terminal D of the input transistor $T_1$ is connected to the negative pole to a supply voltage source $U_B$, whereas the drain terminal of the output transistor $T_2$ is connected to the positive terminal of the supply voltage source. The two source terminals S of both transistors $T_1$ and $T_2$ are connected to each other and to ground through a resistor R. The gate terminal G of the output transistor $T_2$ is connected to ground C and so are the substrate terminals B of both transistors.

The gate terminal G of the input transistor $T_1$ is connected to a control voltage source $-U_{st}$.

A constant current J flows in the direction of the arrow, as shown in FIG. 1, in the drain terminal D of the output transistor $T_2$ when said control voltage $-U_{st}$ is applied to the gate terminal of transistor $T_1$. The positive pole of the control voltage source is connected to ground C, whereby the constant current J is proportional to the control voltage $U_{st}$ and dependent on the size of the resistor R connecting the source terminals S of both transistors to ground C as mentioned. The size of this resistor R is also determining the duration of the built up or transient time of the circuit arrangement. If it is desired to produce currents J in the Pico-Ampere range, this resistor R should have a value of one megohm or smaller also with a view to obtaining short built up or transient times in the order of about 100 $\mu$sec, for example.

It is possible to reverse the direction of the current J in the drain terminal of the output transistor $T_2$ by exchanging the conductivity type of the transistors $T_1$ and $T_2$ and by also changing the polarity of the operating voltage $U_B$, as well as of the control voltage $U_{st}$.

Figure 2:
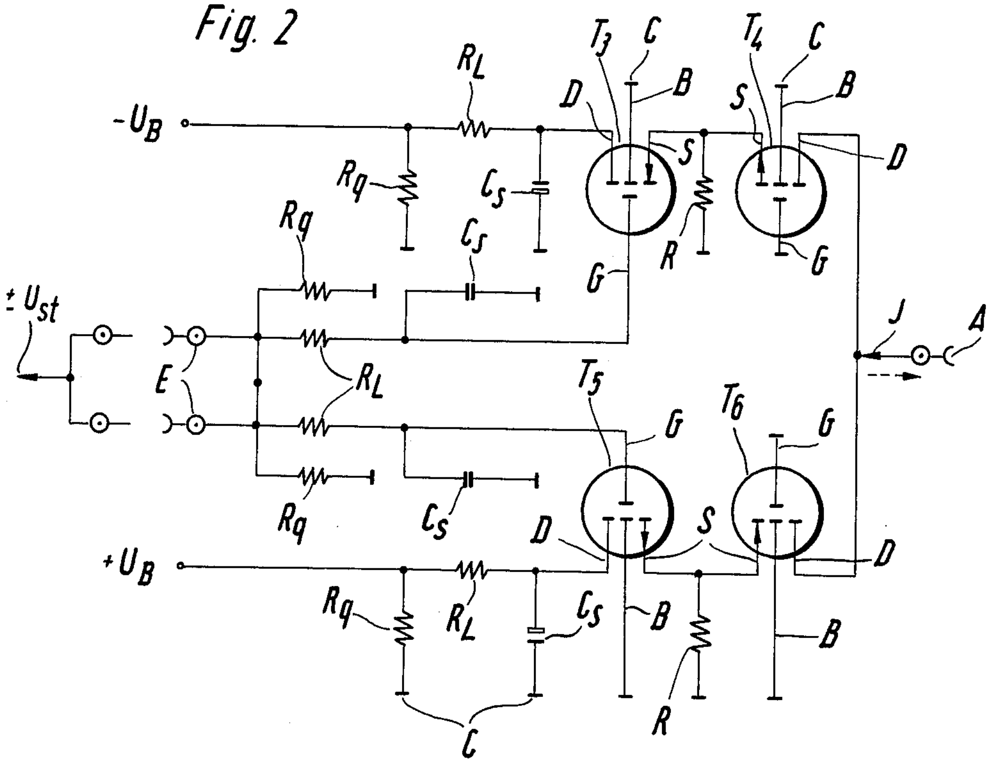

The embodiment of FIG. 2 takes advantage of the just mentioned possibility. FIG. 2 illustrates a circuit arrangement in which two pairs of transistors $T_3$ and $T_4$, as well as $T_5$ and $T_6$ are used. The transistors $T_3$ and $T_4$ correspond to $T_1$ and $T_2$ in FIG. 1, and are arranged in the same circuit configuration. The transistors $T_5$ and $T_6$ are of the opposite polarity type, as compared to $T_3$ and $T_4$. The drain terminals D and the source terminals S of all transistors $T_3$, $T_4$, $T_5$, and $T_6$ are arranged in the circuit of a supply voltage source $U_B$, which is symmetrical relative to ground C. The negative pole $-U_B$ of the supply voltage source is connected to the drain terminal D of the transistor $T_3$. The positive pole $+U_B$ of the supply voltage source is connected to the drain terminal D of the transistor $T_5$. Control voltage input terminals E are connected to the gate terminals G of the transistors $T_3$ and $T_5$. A negative or positive control voltage $\pm U_{st}$ is supplied from a source, not shown, to the input terminals E. The other terminal of the control voltage source is connected to ground C. The circuit arrangement is such that either the two upper transistors $T_3$ and $T_4$ or the two lower transistors $T_5$ and $T_6$ become conducting so that at the common output A to which the drain terminals D of the output transistors $T_4$ and $T_6$ are connected, a constant current J is available having the flow direction indicated by the respective arrows.

FIG. 2 further shows means for protecting the transistors $T_3$ to $T_6$ against overloads and for damping any voltage peaks that might occur, because the control voltage $U_{st}$ is reversible. For this purpose, the drain terminals, as well as the gate terminals of the input transistors $T_3$ and $T_5$ are connected to their respective voltage supplies through respective protective circuits. A series resistor $R_L$ is connected in series between the voltage source and the respective terminal. A shunt resistor $R_q$ is connected between the respective voltage source and ground. A filter capacitor $C_s$ is connected between the respective terminal and ground.

By selecting transistors having a high transconductance, it is possible in both circuit arrangements of the invention to influence the constancy of the currents as well as the built up or transient time. Thus, where the gate-source-resistors are equal to or smaller than 1 megohm, a high current constancy is accomplished, even if these currents have very small values in the range stated above, while simultaneously achieving short transient times.

Although the invention has been described with reference to specific example embodiments, it will be appreciated, that it is intended to cover all modifications and equivalents within the scope of the appended claims.

What is claimed is:

1. A constant current circuit arrangement comprising a pair of enhancement type MOSFETs having opposite conductivities relative to each other and including a first input transistor and a second output transistor, each transistor having a source terminal, a gate terminal, a substrate terminal, and a drain terminal, said gate terminal of said first input transistor providing a control input, a control voltage source having a polarity corresponding to the conductivity type of said first input transistor and being connected to said gate terminal of said first input transistor, said drain terminal of said second transistor providing a constant current output, first means interconnecting said source terminals to each other, resistor means connecting said interconnected source terminals to ground, second means connecting said substrate terminals of both transistors and the gate terminal of the second output transistor to ground, an operating voltage source connected to the drain terminals of both transistors in such a manner that the polarities of the operating voltage source correspond to the respective conductivity type of said first and second transistors, whereby said drain current of said second transistor constitutes a constant current proportional to the control voltage of said control voltage source even if the control voltage has a high switching speed.

2. The circuit of claim 1, comprising a further pair of MOSFETS of the same type as said first pair of transistors and having the same terminals, said second pair of transistors having their conductivities oppositely arranged relative to the conductivities of said first pair of transistors, said control input comprising circuit means (E) operatively connecting said control voltage source with alternating polarities to said gate terminals of the first input transistor in each pair of MOSFETs, said constant current output means comprising a common output circuit means connected to the two drain terminals of said two output transistors for providing a constant output current corresponding in size and direction to the control input voltage, and further circuit means connecting said operating voltage source to said drain terminals of the two input transistors with the respective polarities thereof.

3. The circuit of claim 2, wherein said operating voltage source is symmetrical relative to ground with its positive and negative polarity.

4. The circuit of claim 2, wherein said further circuit means connecting said operating voltage source to said drain terminals of said two input transistors, comprise series resistor means connecting said operating voltage source to the respective drain terminal, shunt resistor means connected between the operating voltage source and ground, and filter capacitor means connected beween the respective drain terminal and ground.

5. The circuit of claim 2, wherein said control input circuit means comprise series resistor means connecting said control voltage source to the respective gate terminal, shunt resistor means connected between said control voltage source and ground, and filter capacitor means connected between the respective gate terminal and ground.

6. The circuit of claim 1, wherein said MOSFETs are selected transistors, each having a high transconductance relative to a normal transconductance.

7. The circuit of claim 1, wherein said resistor means connecting said interconnected source terminals to ground have a resistance corresponding to 1 megohm or less.

* * * * *